US007631815B2

(12) United States Patent
Dahlhoff

(10) Patent No.: US 7,631,815 B2
(45) Date of Patent: Dec. 15, 2009

(54) DEVICE FOR SPRAYING A FLUID

(75) Inventor: Gregor Dahlhoff, Lippetal (DE)

(73) Assignee: Boga GmbH Gesellschaft fuer Moderne Geraetetechnik, Soest (DE)

( * ) Notice: Subject to any disclaimer, the term of this patent is extended or adjusted under 35 U.S.C. 154(b) by 174 days.

(21) Appl. No.: 11/724,515

(22) Filed: Mar. 15, 2007

(65) Prior Publication Data

US 2007/0187526 A1 Aug. 16, 2007

Related U.S. Application Data

(63) Continuation of application No. PCT/EP2005/009745, filed on Sep. 10, 2005.

(30) Foreign Application Priority Data

Sep. 15, 2004 (DE) .................... 10 2004 045 053.6

(51) Int. Cl.
*A01G 27/00* (2006.01)

(52) U.S. Cl. ............................. 239/69; 239/71; 239/73; 239/102.2; 239/338; 239/373

(58) Field of Classification Search ................... 239/67, 239/69, 71, 73, 102.1, 102.2, 338, 373; 222/41, 222/333; 128/200.14, 200.16
See application file for complete search history.

(56) References Cited

U.S. PATENT DOCUMENTS

| | | | | |
|---|---|---|---|---|
| 4,961,885 | A * | 10/1990 | Avrahami et al. | 239/102.2 |
| 5,653,389 | A | 8/1997 | Henderson et al. | |
| 6,357,671 | B1 * | 3/2002 | Cewers | 239/102.2 |
| 6,619,562 | B2 * | 9/2003 | Hamaguchi et al. | 239/102.1 |
| 7,201,163 | B2 * | 4/2007 | Jiang et al. | 128/200.14 |

FOREIGN PATENT DOCUMENTS

| | | |
|---|---|---|
| DE | 1 103 522 | 3/1961 |
| DE | 298 18 765 U1 | 1/1999 |
| DE | 696 25 914 T2 | 11/2003 |
| DE | 202 11 577 U1 | 1/2004 |
| GB | 1 270 700 | 4/1972 |
| JP | 5-309300 | 11/1993 |

* cited by examiner

*Primary Examiner*—Steven J Ganey
(74) *Attorney, Agent, or Firm*—Laurence A. Greenberg; Werner H. Stemer; Ralph E. Locher

(57) ABSTRACT

A device for spraying a fluid contains a receptacle for the fluid that is to be sprayed, a first measuring device which allows a fluid level in the receptacle to be measured, a control and/or regulation device which allows the spraying rate to be regulated, and a spraying device which allows the fluid located in the receptacle to be sprayed. The spraying rate is determined from a measured fluid level with the aid of the control and/or regulation device. An adjusting device is provided which allows the desired spraying rate to be adjusted.

12 Claims, 2 Drawing Sheets

DEVICE FOR SPRAYING A FLUID

CROSS-REFERENCE TO RELATED APPLICATION

This is a continuing application, under 35 U.S.C. §120, of copending international application PCT/EP2005/009745, filed Sep. 10, 2005, which designated the United States; this application also claims the priority, under 35 U.S.C. §119, of German patent application DE 10 2004 045 053.6, filed Sep. 15, 2004; the prior applications are herewith incorporated by reference in their entirety.

BACKGROUND OF THE INVENTION

1. Field of the Invention

The invention relates to a device for spraying a fluid. The device has a container for the fluid to be sprayed, a spraying device by which the fluid located in the container can be sprayed, and a setting device by which the desired spraying rate can be set.

Devices for spraying a fluid of the abovementioned type are used, for example, for the humidification of air. Air humidifiers of this type may be used, for example, in order to keep vegetables and fruit in chill cabinets or else in cold stores moist and thus prevent the fruit and vegetables from drying out. Further, devices for spraying a fluid can be used in order to mix air with a specific active substance. For this purpose, the active substance may either be in liquid form and be sprayed itself or else be dissolved in another liquid, for example water, in which case this solution is sprayed by the device. The spraying of active substances may likewise be employed in order to keep fruit and vegetables fresh. Further fields of use are, however, medical technology or else the disinfection of rooms or appliances.

Particularly when devices for spraying a fluid are employed in medical and disinfection technology, it is also usually necessary for a defined quantity of fluid to be sprayed uniformly. However, previous devices do not provide for regulating the spraying rate.

An obvious approach to regulating the spraying rate is for the quantity of fluid sprayed to be detected at an outlet of the device. This, however, is highly complicated in technical terms and cannot be implemented at justifiable cost.

SUMMARY OF THE INVENTION

It is accordingly an object of the invention to provide a device for spraying a fluid which overcomes the above-mentioned disadvantages of the prior art devices of this general type, with which a spraying rate can be regulated.

With the foregoing and other objects in view there is provided, in accordance with the invention, a device for spraying a fluid. The device includes a container for the fluid to be sprayed, a measurement device for measuring a fluid level in the container, a control and/or regulation device for regulating a spraying rate and connected to the measurement device, and a spraying device for spraying the fluid disposed in the container. The spraying rate is determined from a measured fluid level by the control and/or regulation device. A setting device is provided for setting a desired spraying rate and is connected to the control and/or regulation device.

The object is achieved, according to the invention, in that the device of the type initially mentioned has a measurement device by which the fluid level in the container can be measured, in that the device has, furthermore, a control and/or regulation device by which the spraying rate can be regulated, the spraying rate being determinable from the measured fluid level by the control and/or regulation device. The desired spraying rate can be set by a setting device.

In the device according to the invention, therefore, first, the fluid level in the container is measured. A change in the fluid level in the container can consequently be determined. If the geometry of the container is known, a variation in the fluid volume can be determined from the variation in the fluid level. Since the variation in the fluid volume is dependent on the fluid volume sprayed, the actual spraying rate can be determined as a result. This can then be compared with the desired spraying rate in order to determine a deviation.

The device according to the invention may have a conveyance device by which the fluid to be sprayed is conveyed out of a reservoir into the container. The conveyance device may be a pump.

The device according to the invention may have a second or further measurement device which measures the filling level in the reservoir. The second measurement device may be a level-measuring stick.

In the device according to the invention, the sprayed fluid can be discharged by a transport device. A suitable transport device is a fan or ventilator.

In the device according to the invention, the spraying power, that is to say the actual spraying rate, can be indicated via an indicator device. It is likewise possible for the desired spraying rate or other data also to be indicated.

The device according to the invention can feed information on the spraying operation into and receive it from a data network (BUS system, telephone data network, computer connection) via a communication device. The communication device may be sockets or plugs and/or a modem.

In the device according to the invention, the measurement device may advantageously be an ultrasonic sensor or else a laser, microwave, inductive, capacitive or optical sensor. The spraying device is advantageously an ultrasonic generator.

Other features which are considered as characteristic for the invention are set forth in the appended claims.

Although the invention is illustrated and described herein as embodied in a device for spraying a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
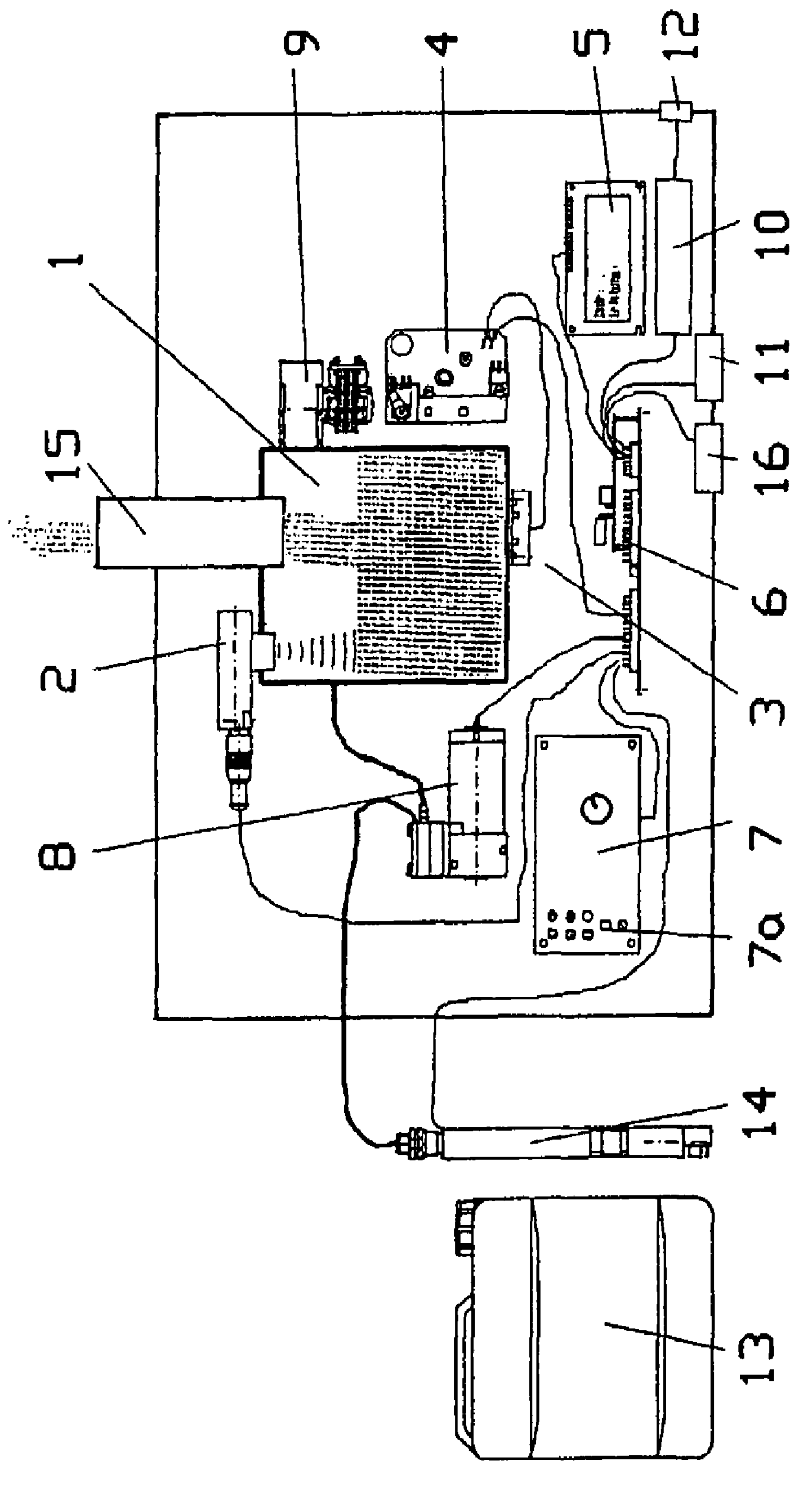
FIG. 1 is a diagrammatic illustration of a device according to the invention.

Referring now to the figures of the drawing in detail and first, particularly, to FIG. 1 thereof, there is shown a device according to the invention which has a container 1, in which a fluid to be sprayed is reserved. To spray the fluid, the device contains an ultrasonic sprayer 3 which is provided on or in a bottom of the container 1. The ultrasonic sprayer 3 has external wiring 4 which is provided on a circuit carrier. The ultrasonic sprayer 3 is supplied via the wiring 4 with current and/or voltage such that the fluid provided in the container 1 is sprayed to a desired extent. The sprayed fluid is concentrated above a liquid level in the container 1 and is blown out of the container 1 via a pipe 15 at a transport device 9, in the present case this being a ventilator.

To regulate the spraying rate of the fluid sprayed by the ultrasonic sprayer 3, the device according to the invention has a control and/or regulation device 6 which, on the one hand, is connected to the wiring 4 of the ultrasonic sprayer 3, so that actuating signals can be delivered to the wiring 4, and, on the other hand, is connected to a first measurement device 2 by which a level of the fluid in the container 1 can be measured. The first measurement device 2 is an ultrasonic distance sensor which is mounted on the top side of the container 1.

Figure 2:
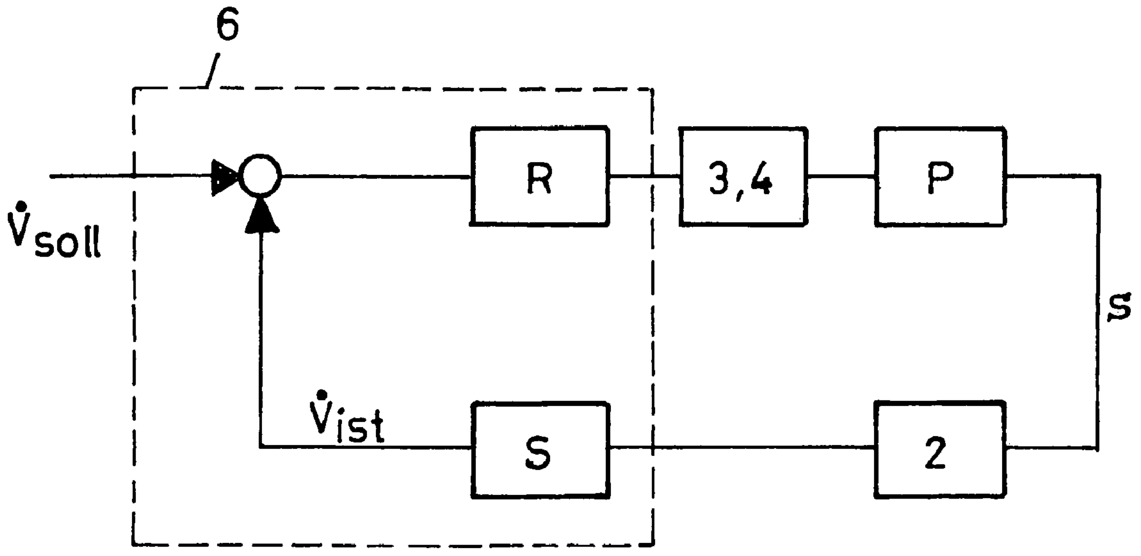
FIG. 2 is a block diagram of a closed loop of the device according to the invention.

The functioning of the control (FIG. 2) is such that the filling level of the fluid in the container 1 is measured continuously or at discrete time points via the first measurement device 2. The signal corresponding to the filling level s of the fluid is delivered to the control and/or regulation device 6. In the control and/or regulating device 6, the spraying rate $\dot{V}_{act}$ is determined from a value for a filling level s in a computer unit S. For this purpose, a variation $\dot{S}$ is determined, from which the actual spraying rate $\dot{V}_{act}$ can readily be determined if the cross section of the container 1 is known. In the case of a container 1 having a uniform cross section, it is sufficient to multiply the variation in the filling level s by the cross-sectional area of the container. Basically, the variation in the volume of the fluid stored in the container 1 is then obtained. Since any variation in the fluid volume and, in particular, any decrease in the fluid volume in the container 1 are caused by a spraying of the fluid, the variation in the fluid volume must correspond to the spraying rate.

The actual spraying rate $\dot{V}_{act}$ thus determined is then compared with the desired spraying rate $\dot{V}_{des}$. From a deviation existing between the two values, a controller of the control and/or regulation device 6 then determines a correcting variable which is sent to the wiring 4 of the ultrasonic sprayer. If the actual spraying rate $\dot{V}_{act}$ is too low, the power of the ultrasonic sprayer 3 is increased, whereas, if the actual spraying rate is higher than the desired spraying rate $\dot{V}_{des}$, the power of the ultrasonic sprayer 3 is reduced by the controller.

The control and/or regulation device 6 is connected, moreover, to an indicator device 5, in which, for example, the actual spraying rate $\dot{V}_{act}$ and/or the desired spraying rate $\dot{V}_{des}$ are/is indicated.

The desired value for the spraying rate $\dot{V}_{des}$ can be set via a setting device 7 which is connected to the control and/or regulation device 6. Structurally different light-emitting diodes 7*a*, by which the operating state of the device according to the invention can be indicated, are connected to the setting device 7.

The device according to the invention has three interfaces 11, 12, 16 by which the device according to the invention can be connected to data networks. The first interface 11 is a connection via which the device can be connected to a bus. The second interface 12 is a socket via which the device can be connected to a telephone network. The connection 12 is preceded on the appliance side by a modem 10. A computer can be connected to the serial interface 11. Both the modem 10 and the interfaces 11 and 16 are connected to the control and/or regulation device 6. By use of the interfaces 11, 12 and 16, it is possible to monitor remotely or else even control remotely the function of the device according to the invention.

Since only a finite volume of the fluid to be sprayed is available in the container 1, and so as to prevent the device from running dry, fluid must be topped up at regular intervals or continuously. In the device illustrated in FIG. 1, new fluid is conducted into the container 1 at regular intervals. For this purpose, the device has a pump 8 which sucks in fluid from an exchangeable reservoir 13 via what is known as a level-measuring stick 14 and conveys it into the container 1. The exchangeable reservoir 13 is a canister into which the level-measuring stick 14 can be inserted.

The level-measuring stick 14 is configured such that a prewarning is given via a connecting line to the control and/or regulation device 6 in the case of a low fluid level in the reservoir. Finally, in the case of an even lower level of the fluid in the reservoir 13, the level-measuring stick 14 gives a warning to the control and/or regulation device 6. The prewarning is intended to draw attention of an operator to the imminent change of the reservoir, and the warning is ultimately intended to induce the operator to exchange the reservoir 13. The filling level in the container 1 is monitored by the first measurement device 2 in order to prevent the ultrasonic sprayer 3 from running dry.

As soon as the fluid level in the container 1 has undershot a lower limit, the control and/or regulation device 6 activates the pump 8 in order to convey liquid out of the reservoir 13 into the container 1. By the fluid being transported out of the reservoir 13 into the container 1, the fluid level in the container 1 is varied. This, of course, has an influence on the regulation of the spraying rate which is based on the measurement of the filling level in the container 1. It is therefore necessary for the control to take into account the liquid quantity pumped out of the reservoir 13 into the container 1. Alternatively, the control may be switched off for the moment at which liquid is pumped out of the reservoir 13 into the container 1. Since the transport of liquid out of the reservoir 13 into the container 1 lasts only a short time, switching off the control of the spraying rate has no influence on the suitability of the device according to the invention for practical purposes.

I claim:

1. A device for spraying a fluid, comprising:

a container for the fluid to be sprayed;

a measurement device for measuring a fluid level in said container;

a control and/or regulation device for regulating a spraying rate and connected to said measurement device;

a spraying device for spraying the fluid disposed in said container; and a setting device setting a desired spraying rate and connected to said control and/or regulation device;

said control and/or regulation device determining an actual spraying rate based on a variation of the fluid level measured by said measurement device: and said control and/or regulation device correcting a deviation between the actual spraying rate and the desired spraying rate.

2. The device according to claim 1, further comprising:

a reservoir; and a conveyance device for conveying the fluid to be sprayed out of said reservoir and into said container.

3. The device according to claim 2, wherein said conveyance device is a pump.

4. The device according to claim 2, further comprising a further measurement device measuring a filling level in said reservoir.

5. The device according to claim 4, wherein said further measurement device is a level-measuring stick.

6. The device according to claim 1, further comprising a transport device for discharging a sprayed fluid.

7. The device according to claim 6, wherein said transport device is selected from the group consisting of a fan and a ventilator.

8. The device according to claim 1, further comprising an indicator device indicating a spraying power and connected to said control and/or regulating device.

9. The device according to claim 1, further comprising at least one communication device connected to said control and/or regulating device.

10. The device according to claim 9, wherein said communication device is selected from the group consisting of a modem and an interface to a bus system.

11. The device according to claim 1, wherein said measurement device is an ultrasonic sensor.

12. The device according to claim 1, wherein said spraying device is an ultrasonic generator.

* * * * *